Feb. 23, 1932.     A. G. RIPBERGER ET AL     1,846,041
COOLING JACKET FOR ELECTRODES
Filed June 15, 1931

INVENTORS
A. G. Ripberger
R. V. Lincoln
BY
ATTORNEYS

Patented Feb. 23, 1932

1,846,041

UNITED STATES PATENT OFFICE

ALEXANDER G. RIPBERGER AND RICHARD V. LINCOLN, OF ZANESVILLE, OHIO, ASSIGNORS TO OHIO FERRO-ALLOYS CORPORATION, OF CANTON, OHIO, A CORPORATION OF OHIO

COOLING JACKET FOR ELECTRODES

Application filed June 15, 1931. Serial No. 544,502.

The invention relates to cooling jackets, and more particularly to water cooled jackets for vertically disposed electrodes in an electric furnace, which electrodes are movable vertically relative to the jacket.

It is common practice to support vertically disposed electrodes within an electric furnace by clamping each electrode in a metal, current-conducting electrode holder which is vertically adjustably suspended from above the furnace. As the lower end of the electrode is burned off or consumed, the electrode holder and the electrode may be lowered as a unit to compensate for this consumption. However, when the lower end of the electrode has been burned off to a considerable extent, it becomes necessary to loosen or unclamp the electrode holder and slip the electrode downwardly relative to the holder. When a sufficient portion of the lower end of the electrode is extended beneath the holder, the holder is again clamped around the sides of the electrode.

The electrode holder is preferable constructed of metal such as copper, and may include hollow metal contact pads which engage the surface of the electrode. The electrode is usually made of carbon or graphite and the like. To insure a high degree of electrical efficiency in operating the furnace, it is necessary to have and to maintain the contacting surfaces of the electrode and the holder contact pad in a substantially perfectly smooth condition; otherwise arcing will occur.

It has been found that, although the contacting surfaces are perfectly smooth when the furnace is put into operation, if the surface of the electrode becomes rough, arcing will occur and the result will be to pit the contacting surface of the contact pad and more or less permanently impair the proper working of the furnace, unless a new contact pad is inserted.

Where electrodes are vertically suspended within the furnace, it will be seen that substantially the entire surface of each electrode is subjected to the oxidizing action of the hot gases arising from the furnace. This oxidation of the electrode constitutes a monetary loss, and moreover, when the electrode is slipped downwardly relative to the holder, the contacting surface of the holder contact pad contacts with the rough oxidized surface of the electrode which has been previously located immediately above the contact pad, and arcing results impairing the efficient and proper operation of the furnace.

It is an object of the present invention to provide an electrode cooling jacket which will substantially prevent excessive loss of the electrode material during operation of the furnace.

Another object of the invention is to provide a cooling jacket for an electrode which will maintain the surface of the electrode located above the electrode holder contact pad in a substantially smooth condition, so that a satisfactory contact is established between the contact pad and the electrode at all times.

Another object of the invention is to provide a cooling jacket for a vertically disposed electrode, which jacket is supported by the electrode holder and which permits free vertical movement of the electrode relative to the holder.

A further object of the invention is to provide a cooling jacket for an electrode and the like, which jacket is maintained full of the cooling medium, and in which jacket substantially uniform circulation of the cooling medium is maintained throughout.

These and other objects are attained by the improvements comprising the present invention, as will hereinafter be pointed out in detail and set forth in the appended claims.

In general terms the invention comprises a hollow jacket entirely engirdling an electrode and supported on the electrode holder, there being a slight clearance between the electrode and the jacket, a baffle wall in the jacket near the bottom wall thereof and spaced therefrom forming a lower jacket chamber extending continuously around the electrode and a relatively large upper jacket chamber extending continuously around the electrode from the baffle wall to the top of the jack, the baffle wall being provided with apertures communicating between the upper and lower jacket chambers, inlet ports communicating with the lower jacket chamber, and an outlet port communicating with the top of the upper jacket chamber.

A preferred embodiment of the present improvements is illustrated in the accompanying drawings in which Figure 1 is a fragmentary elevation of a vertically disposed electrode and its suspending means, showing the application of the improved cooling jacket thereto;

Similar numerals refer to similar parts throughout the several views.

Figure 1:
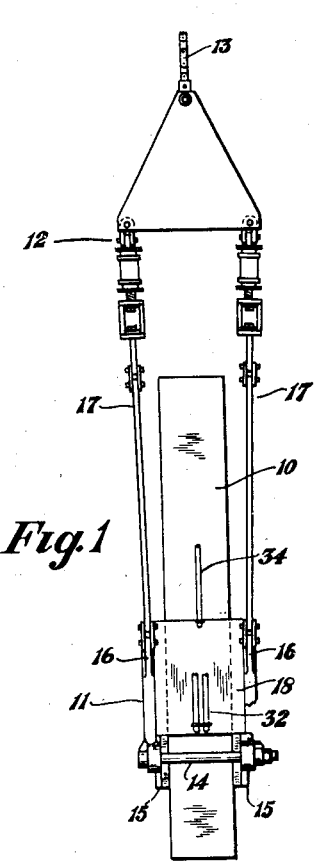
Figure 4:
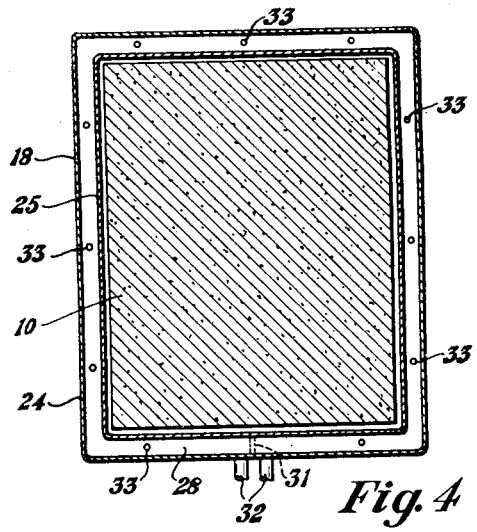
Fig. 4 is a plan section view of the electrode and jacket detached from the electrode holder, taken substantially on line 4—4, Fig. 3.
Figure 2:
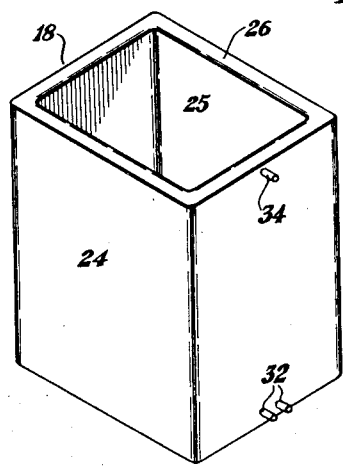
Fig. 2 is a detached perspective view of the improved cooling jacket.

Referring to Fig. 1 of the drawings, a vertical electrode 10, which may be rectangular in cross section, is suspended from above the furnace by means of the electrode holder 11, hanger means 12, and chain 13. The electrode holder is clamped around the electrode by means of bolts 14 which clamp the hollow contact pads 15 between the holder and the sides of the electrode. The electrode holder is preferably separable and includes two halves, each of which is provided with an attaching flange 16 to which a linkage 17 of the hanger means is secured, and the hanger means is vertically adjustably suspended from above the furnace by means of the chain 13.

The improved cooling jacket, indicated generally at 18, is tubular and adapted to loosely fit around or engirdle the electrode 10, sufficient clearance being provided between the electrode and the jacket to permit vertical movement of the electrode without frictional engagement with the jacket. This clearance, however, is insufficient to permit any material amount of gases arising from the furnace to pass upward between the electrode and jacket.

In the drawings the jacket 18 is shown rectangular to fit around the rectangular electrode 10, but it will be understood that the jacket may be cylindrical to fit around a cylindrical electrode without departing from the scope of the invention.

Figure 3:
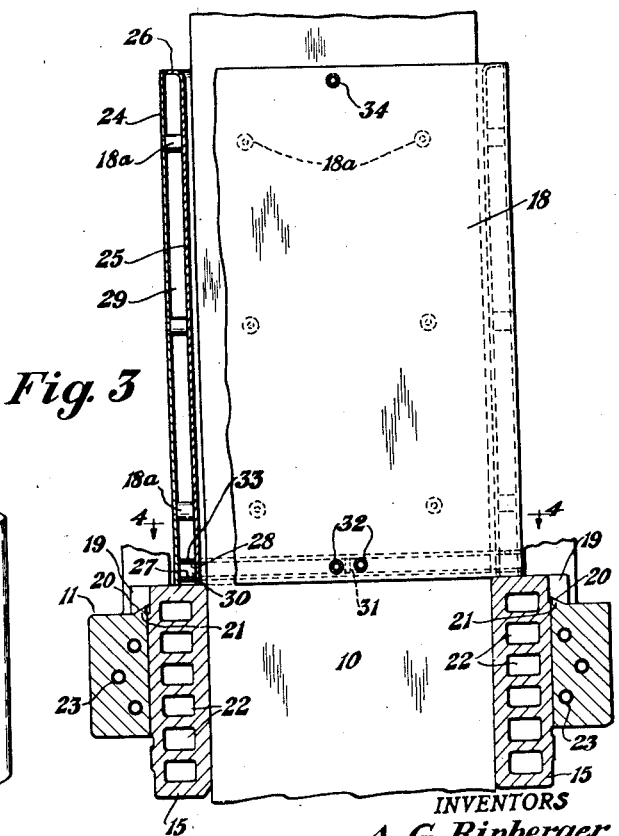
Fig. 3 is an enlarged fragmentary view of the electrode and jacket, similar to Fig. 1, parts of the jacket being broken away to show its internal structure and the electrode holder and contact pads being shown in section.

As best shown in Fig. 3, the jacket 18 is adapted to be supported upon the upper surfaces of the contact pads 15. Means for supporting the pads upon the holder 11 may include lugs 19 extending outwardly from the upper portion of the pads. The angular under surfaces 20 of the lugs 19 are adapted to wedgeably engage over angular flanges 21 formed on each half of the electrode holder 11, and each half of the holder is preferably clamped against the contact pads by means of the bolts 14.

Ducts 22 and 23 may be provided in the pads 15 and holder halves 11 respectively, through which a cooling medium is circulated.

The cooling jacket 18 may be of sheet metal and preferably includes an outer shell 24 and an inner shell 25 spaced therefrom, the shells being adapted to extend longitudinally of the electrode and being disposed vertically when positioned around the electrode. The inner shell 25 may be bent angularly outward at its upper end to form a substantially horizontal top plate member 26 extending between the inner and outer shells and continuously around the entire jacket. Preferably the top plate member 26 is welded to the shell 24 to form a water tight joint.

A substantially horizontal disposed bottom plate member 27 extends between the inner and outer shells 24 and 25, respectively, at the other or bottom end of the jacket, and is preferably welded to each of the shells to form water tight joints therewith.

Thus the inner and outer shells form the side walls of the jacket, and the top and bottom plate members 26 and 27 form the end walls thereof.

A substantially horizontal baffle or partition wall 28 is provided between the inner and outer shells 24 and 25, and extends continuously around the entire jacket in a plane spaced slightly above the bottom plate member 27. This baffle wall 28 is preferably welded to each of the shells to form water tight joints therewith.

The baffle wall 28 divides the jacket 18 into an upper cooling chamber 29 and a relatively small lower cooling chamber 30, each of the chambers 29 and 30 being continuous and entirely engirdling the electrode when the jacket is positioned around the same.

A vertically disposed partition wall 31 may be provided at one side of the jacket 18 in the chamber 30, and extends between the inner and outer shells 24 and 25 and between the bottom plate member 27 and the baffle wall 28.

Spacer members 18a may be provided between the inner and outer shells 24 and 25 at spaced intervals around all sides of the jacket for the purpose of maintaining the shells substantially rigid and spaced from each other when the jacket is subjected to the hot gases arising from the furnace. These spacer members 18a may be sections of cylindrical non-magnetic material cut to proper length, and may be welded at their inner ends to the inner shell 25 and at their outer ends to the outer shell 24.

A pair of inlet pipes 32 may be provided for introducing a cooling medium into the lower cooling chamber and these pipes are preferably located one on each side of the vertical partition wall 31, so that the cooling medium entering the chamber 30 will first flow in opposite directions entirely around the jacket 18.

The horizontal baffle wall 28 is preferably provided with a series of apertures 33 located at intervals around the jacket, so that when the chamber 30 has become filled with the cooling medium, the medium will be forced through the apertures 33 and projected upwardly in jets into the chamber 29 at intervals around the jacket, thus cooling all sides of the electrode adjacent the jacket.

An outlet pipe 34 communicates with the chamber 29 at the top of the jacket 18, so that when the chamber 29 becomes filled with the cooling medium the same will discharge through said outlet. The outlet pipe 34 is carried upwardly from the top of the jacket, and is connected with a flexible tube (not shown) which hangs in a loop and permits vertical movement of the electrode. This insures that the entire jacket is always filled with the cooling medium as long as the same is being introduced into the chamber 30 through the inlet pipes 32. The remote end of the flexible tube may be connected to an open discharge.

In the operation of the improved jacket, the cooling medium, which may be water, is first introduced into the lower chamber 30 of the jacket 18. When that chamber becomes filled, the water is forced through the apertures 33 in the baffle wall 28 and projected in jets upwardly into the chamber 29 at intervals around all sides of the electrode. When the chamber 29 has become filled, the water therein discharges through the pipe 34, and since the pipe 34 leads upwardly from the jacket, the jacket chambers 29 and 30 are maintained full of water as long as water is being introduced through the pipes 32.

Thus it will be seen that substantially uniform circulation is maintained throughout the jacket chambers around all sides of the electrode, preventing the formation of steam pockets in the jacket and maintaining all surfaces of the electrode adjacent to the jacket relatively cool.

When it is desired to slip the electrode downwardly relative to the holder to compensate for consumption of the bottom of the electrode, the bolts 14 may be loosened to permit the halves of the electrode holder 11, together with their contact pads 15, to move slightly outwardly; the jacket 18 still resting on the contact pads. The electrode is then slipped downwardly the required distance, and the holder and the contact pads are reclamped at a new position around the electrode. The surfaces of the electrode now in contact with the contact pads have been previously cooled and maintained in a substantially smooth condition by the improved cooling jacket 18, which extends upwardly from the contact pads a sufficient distance to satisfactorily cool the outer surfaces of the electrode which are subjected to the greatest oxidizing effect of the heat arising from the furnace.

Thus the entire outer surface of the electrode above the contact pads is maintained in a substantially smooth condition, with the result that a smooth contact between the pads and the electrode is always provided as the electrode is slipped downwardly from time to time, and the monetary loss of electrode material due to oxidation is inconsequential. The improved jacket may be made of stainless steel of the non-magnetic variety to prevent any additional heating of the jacket due to current induced from the current flowing through the holder to the electrode; but this precaution is not absolutely essential.

It will be seen that the improved jacket may be adapted to various shapes of electrodes, and may be applied to a variety of types of electrode holders without departing from the scope of the invention as defined in the appended claims.

We claim:

1. A jacket for engirdling an electrode and the like, the jacket including inner and outer side walls and end walls forming a closed chamber extending continuously around the electrode, a baffle wall located in the jacket near one end wall and extending between the inner and outer side walls continuously around the electrode to form two chambers within the jacket, the baffle wall being provided with a series of apertures communicating between the chambers, an inlet pipe at one end of the jacket communicating with one of said chambers, and an outlet pipe at the other end of the jacket communicating with the other chamber.

2. A jacket adapted for engirdling an electrode and the like, the jacket including inner and outer side walls and end walls, a baffle wall extending between the inner and outer side walls substantially parallel with the end walls to form two chambers within the jacket, the baffle wall being provided with a series of apertures communicating between said chambers, a longitudinal partition wall in one chamber extending between the baffle wall and end wall and perpendicular thereto, an inlet pipe communicating with the last said chamber at each side of the partition wall, and an outlet pipe communicating with the other chamber.

3. In combination with a vertically disposed electrode carried by an electrode holder, a cooling jacket supported on the holder and slidably engirdling the electrode, means for introducing a flow of cooling medium in the bottom portion of the jacket, and baffle means in the jacket for substantially uniformly circulating the cooling medium in the jacket from the bottom thereof upwardly around all sides of the electrode simultaneously.

4. In combination with a vertically disposed electrode carried by a holder clamped around the electrode, a cooling jacket slidably engirdling the electrode and supported on the holder, means for admitting a cooling medium to the bottom of the jacket, means for discharging the cooling medium from the top of the jacket, and baffle means within the jacket for effecting a substantially uniform circulation of the cooling medium from the bottom to the top of the jacket around all sides of the electrode simultaneously.

5. In combination with a vertically disposed electrode carried by a holder, a cooling jacket supported on the holder and slidably engirdling the electrode, the jacket including a top, bottom and side walls and a baffle wall located near the bottom wall, means for circulating a cooling medium around the electrode between the bottom wall and the baffle wall, the baffle wall being provided with apertures for simultaneously circulating water upwardly around all sides of the electrode, and discharge means located adjacent the top wall of the jacket.

6. In combination with an electrode, a holder clamped around the electrode, a cooling jacket resting on the holder and slidably engirdling the electrode, means for introducing a flow of cooling medium at one end of the jacket, and baffle means in the jacket for substantially uniformly circulating the cooling medium through the jacket from one end to the other.

7. A tubular jacket including an inner shell, an outer shell spaced therefrom and coaxial therewith, end walls extending between the shells, a partition wall between the shells parallel with and adjacent one end wall and provided with a series of apertures, an inlet port formed in the outer shell between the partition wall and the adjacent end wall, and an outlet port formed in the outer shell adjacent the other end wall.

8. A tubular jacket including an inner shell, an outer shell spaced therefrom and coaxial therewith, an end wall extending between the shells, a partition wall extending between the shells parallel with and adjacent the end wall and provided with a series of apertures, and an inlet port formed in the outer shell between the partition wall and the end wall.

In testimony that we claim the above we have hereunto subscribed our names.

ALEXANDER G. RIPBERGER.
RICHARD V. LINCOLN.